United States Patent [19]

Hirao et al.

[11] Patent Number: 4,685,597
[45] Date of Patent: Aug. 11, 1987

[54] AEROSOL CONTAINER AND PROCESS FOR MANUFACTURING SAME

[75] Inventors: Katsumi Hirao, Osaka; Toshio Miyake, Okayama, both of Japan

[73] Assignees: Kabushiki Kaisha Hayashibara Seibutsu Kagaku Kenkyujo, Okayama; Kanpe Katei Toryoo Kabushiki Kaisha, Osaka, both of Japan

[21] Appl. No.: 900,254

[22] Filed: Aug. 25, 1986

Related U.S. Application Data

[63] Continuation of Ser. No. 663,972, Oct. 23, 1984, abandoned.

[30] Foreign Application Priority Data

Nov. 12, 1983 [JP] Japan ................................ 58-213039

[51] Int. Cl.4 ............................................. B67D 5/42
[52] U.S. Cl. ...................................... 222/389; 222/387
[58] Field of Search ....................... 222/386, 387, 389

[56] References Cited

U.S. PATENT DOCUMENTS

| | | |
|---|---|---|
| 1,934,225 | 11/1933 | Candor ................................ 222/387 |
| 1,971,450 | 8/1934 | Heitmuller et al. .................. 222/387 |
| 2,818,999 | 1/1958 | Miller ............................... 222/387 X |
| 3,923,208 | 12/1975 | Bergloff .............................. 222/386 |
| 4,271,991 | 6/1981 | Diamond .............................. 222/389 |
| 4,355,736 | 10/1982 | Schumacker et al. ................. 222/80 |
| 4,556,156 | 12/1985 | Frutin ............................... 222/386.5 |

Primary Examiner—Joseph J. Rolla
Assistant Examiner—Michael S. Huppert
Attorney, Agent, or Firm—Browdy and Neimark

[57] ABSTRACT

A novel aerosol container structure includes a container body having its different ends a product spout and a propellant inlet both openable and closable, a plate member slidable along on the inside wall of the container body, and a sealant for sliding contact section in a layer containing water or a polyol, wherein the plate member is inserted into said container body to separate its inner space into two sections, one section with the product spout used as product area, and the other section with propellant inlet used as propellant area, and also to hold the sealant in a layer at the sliding contact section located between the periphery of the plate member and the inside wall of the container body, as well as to a process for manufacturing the same.

5 Claims, 3 Drawing Figures

1

AEROSOL CONTAINER AND PROCESS FOR MANUFACTURING SAME

This application is a continuation, of application Ser. No. 663,972, filed Oct. 23, 1984, now abandoned.

FIELD OF THE INVENTION

The present invention relates to an aerosol container whose content can be spouted out by propellant. More particularly, it relates to such aerosol container wherein the product- and propellant-areas are isolated by a slidable plate, as well as to a process for manufacturing the same.

BACKGROUND OF THE INVENTION

Aerosol containers of this type are illustrated, for example, in Japan Utility Model Publication No. 1,474/70 and Japan Patent Kokai No. 11,673/83.

The aerosol container disclosed in Japan Utility Model Publication No. 1,474/70 uses silicone rubber as sealant for the sliding contact section in order to compensate the inferior gas-barriering ability of the piston means (i.e. slidable plate) with the purpose of stopping the leakage of a liquefied gas from the propellant area into the propellant area through a narrow gap, i.e. sliding contact section, located between a piston means and the inside wall of the container. Silicon rubber, however, has its disadvantages that it is insufficient in gas-barriering ability and hinders the piston means to move smoothly, as well as additional disadvantages that it deteriorates rapidly and does not endure prolonged use.

Japan Patent Kokai No. 11,673/83 teaches the use of lubricants such as white petrolatum, grease or palm oil as sealant for the sliding contact section in place of silicone rubber, and it is reported that these lubricants exhibit satisfiable sealing effect. It was confirmed that such lubricants, however, dissolve the liquefied gas used as propellant, resulting in an imperfect sealing and eventually in the leakage of the propellant into product area within a short period of time.

Japan Patent Kokai No. 11,673/83 also teaches a procedure to manufacture aerosol container comprising the steps of filling a product while keeping the bottom of a container body having a spout (e.g. nozzle) upward, inserting the first slidable plate (e.g. piston means), sealant and the second slidable plate (e.g. piston means) in the give order into the container body, filling a propellant as injection agent, and sealing the open end of the container body. Such procedure to manufacture aerosol container, however, has the following disadvantages:

(1) In such procedure including the steps of first filling a liquefied gas as propellant while leaving the propellant area of the container open, then sealing the opening, it is not desirable to seal at normal temperature and pressure because of the vigorous evaporation of the liquefied gas during the sealing step. Accordingly, the sealing step should be carried out at a very low temperature, e.g. −40° C. or lower, wherein the liquefied propellant gas is still in liquid form. Furthermore, such procedure is not feasible for a compressed propellant gas.

(2) In such procedure including the steps of first filling the product in the container body while keeping its bottom upward, then inserting the slidable plate (e.g. piston means) into the container body, a small portion of air present between the product and the slidable plate may be incorporated into the product, resulting in the occurrence of inferior products.

(3) Since such procedure requires filling of the product in the course of manufacturing the container per se, container manufacturers were required to install an appropriate filling system, otherwise aerosol product manufacturers were required to install a container manufacturing system.

It is very difficult to smoothly practice such procedure because the techniques for manufacturing aerosol container and for filling product into such container belong to entirely different technologies.

Desirably, it is much more practicable that the container manufacturer takes the responsibility of producing containers and supplying them to aerosol product manufacturer, and that the aerosol product manufacturer takes the responsibility of filling his product and a propellant to manufacture aerosol products.

BRIEF DESCRIPTION OF THE DRAWING FIGURES

The drawing figures show the embodiments according to the invention.

FIG. 1 shows a longitudinal section view of the whole structure;

FIG. 2, a grossly enlarged section view of the sliding part of the slidable plate in the aerosol container shown in FIG. 1; and FIG. 3, a grossly enlarged sectional view of the sliding part of the slidable plate when sealant layer is annularly formed.

In the drawing figures, (1) shows container body; (2), slidable plate; (3), product area; (4), propellant area; (5), sealant layer; (6), propellant inlet; (7), bottom plate; (8), product spout; (9), top plate; (10), nozzle means; and (11), engaging plate.

DETAILED DESCRIPTION OF THE INVENTION

Figure 1:
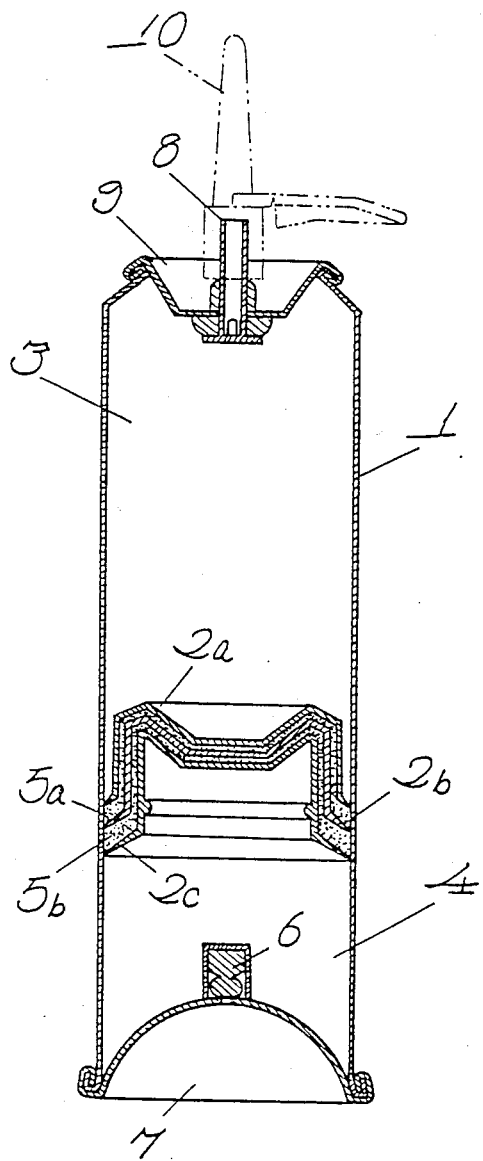
Figure 2:
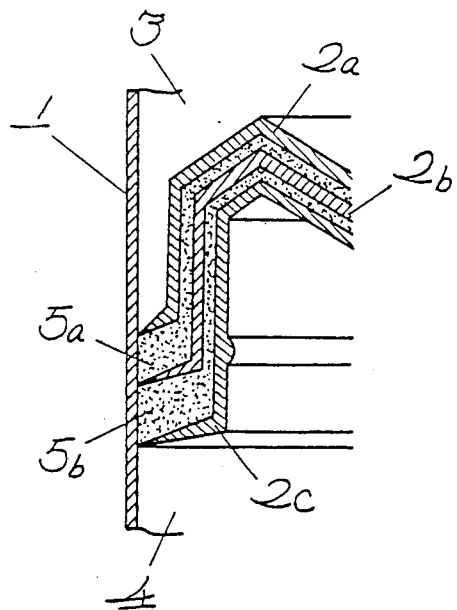

The present inventors investigated various means to overcome the above described disadvantages. As a result, we found that the product-and propellant-areas in an aerosol container can be perfectly isolated by placing a slidable plate on the inside wall of a container body, and holding a sealant for sliding contact section in layer containing either water or a polyol between the periphery of said slidable plate and the inside wall of said container, and that a suitable product can be filled therein and spouted out when needed. Furthermore, we also found that the above described disadvantages can be overcome by employing an improved process for manufacturing aerosol container. This is the present invention.

More particularly, the present invention relates to an aerosol container structure comprising a container body in cylindrical form having at its different ends a product spout and a propellant inlet both openable and closable, a plate member slidable along on the inside wall of said container body, and a sealant for sliding contact section in layer containing either water or a polyol, wherein said plate member is placed on the inside of said container body to separate its inner space into two sections, one section with the product spout used as product area and the other with the propellant inlet used as propellant area, and also to hold said sealant in layer at the sliding contact section located between the periphery of said plate member and the inside wall of said container body.

The present invention also relates to a process for manufacturing such aerosol container comprising the steps of providing a container body in cylindrical form; placing in said container body a slidable plate having a sealant for sliding contact section in layer containing water or a polyol at its periphery to separate the inner space of said container body into two sections; sealing the opening end of one section with a bottom plate having an openable and closable propellant inlet to provide a propellant area; filling a suitable product into the other section to obtain a product area; sealing the opening end of the product area with a top plate having a product spout which is openable and closable; and filling a suitable propellant into the propellant area through the inlet.

The sealants usable in the invention are those which contain either water or a polyol, and, desirably, have a viscosity in the range of 5–20,000 poises. Water, polyol and mixtures thereof may be used as long as they have such properties as sealant.

Throughout this specification, the viscosity is measured at 25° C. by use of a viscometer of BH type, a product of Tokyo Keiki KK, Tokyo, Japan, unless specified otherwise.

As to the polyol as referred to in the invention, monosaccharides such as xylose, glucose and fructose; monosaccharide alcohols such as xylitol, sorbitol and mannitol; oligosaccharides such as maltose, isomaltose, lactose, sucrose and maltotriose; oligosaccharide alcohols such as maltitol, lactitol, maltotriitol; starch sugar; hydrogenated starch sugar and dextrins can be favorably used, in addition to, for example, ethylene glycol, propylene glycol, butylene glycol, amylene glycol, glycerin and polyglycerin.

We found that compositions containing 0.001–10 parts by weight of a viscosity-imparting agent against one part by weight of water or a polyol and having a viscosity in the range of 5–20,000 poises are very useful as the sealant for sliding contact section.

The viscosity-imparting agents as referred to in the invention are water-soluble substances capable of imparting the prescribed viscosity, i.e. 5–20,000 poises, to water or a polyol: Examples of suitable viscosity-imparting agents are synthetic polymers such as polyethylene oxide, polyethylene glycol, polyvinyl alcohol, polyvinyl pyrrolidone, water-soluble acryl resin, water-soluble polyester resin, water-soluble phenol resin, water-soluble polyamide resin, maleinized oil, maleinized polybutadine, polyvinyl methyl ether, emulsion powder, and emulsion of synthetic resin; natural hydrophilic polymers such as pullulan, elsinan, dextran, levan, mannan, gum arabic, tragacanth gum, guar gum, xanthan gum, carrageenan, pectic substance, hydroxyethyl starch, carboxymethyl cellulose, hydroxyethyl cellulose, casein, and soybean protein; and their derivatives.

Certain inorganic powders such as water glass, aluminum silicate, benton, silica, magnesium silicate, titanium oxide and kaolinite may substitute the above described hydrophilic organic substances, or may be used in combination with the substance, intact or after treatment with an appropriate organic substance.

An appropriate amount of germicidal agent, surface-activating agent, antifoam, pH-regulating agent or emulsion stabilizer may be incorporated into the sealant if necessary.

The sealants usable in the present invention will be illustrated with the following examples.

EXAMPLE FOR REFERENCE 1

Six parts by weight of pullulan, having an average molecular weight of 200,000, 93.5 parts by weight of glycerin and 0.5 parts weight of sugar ester, were mixed to homogeneity by stirring and heating to 110° C. The relative viscosity of the resultant composition was 84–102 poises at 40° C., and 920–1,140 poises at 12° C.

The composition was suitable as sealant for sliding contact section in an aerosol container wherein a liquefied propellant gas is used.

The six month standing of the composition at 45° C. resulted in neither deterioration nor alteration of the composition.

This example illustrates a formulation which causes neither toxicity nor harm to human or animal. Thus, the composition is favorably usable in various household products wherein a compressed or liquefied gas becomes into contact with the sliding contact section.

EXAMPLE FOR REFERENCE 2

Ten parts by weight of pullulan, having an average molecular weight of 100,000, and 90 parts by weight of ethylene glycol, were mixed to homogeneity by stirring and heating to 120° C.

The composition prepared in this example was also suitable as sealant for sliding contact section, and compared well with that at Example for Reference 1.

EXAMPLE FOR REFERENCE 3

Three parts by weight of elsinan, having an average molecular weight by weight of 200,000, 54 parts by weight of glycerin, 42.5 parts by weight of sorbitol powder and 0.5 parts by weight of alkali metal salt of higher fatty acid, were mixed to homogeneity by stirring and heating to 120° C.

The composition was also suitable as sealant for sliding contact section, and compared well with that at Example for Reference 1.

EXAMPLE FOR REFERENCE 4

Five parts by weight of elsinan, having an average molecular weight of 300,000, 3 parts by weight of water, 52 parts by weight of ethylene glycol, 39.7 parts by weight of maltitol powder, and 0.3 parts by weight of mono-glyceride of fatty acid, were mixed to homogeneity by stirring and heating to 80° C.

The composition was also suitable as sealant for sliding contact section, and compared well with that at Example for Reference 1.

EXAMPLE FOR REFERENCE 5

A composition was prepared similarly as in Example for Reference 2, except that the pullulan was replaced with hydroxyethyl starch having an average molecular weight of 100,000.

The adhesiveness of the composition was relatively inferior to that of the one disclosed in Example for Reference 2 using pullulan, but sufficient for the practical use as sealant for sliding contact section.

EXAMPLE FOR REFERENCE 6

A composition was obtained similarly as in Example for Reference 4, except that gum arabic having an average molecular weight of 300,000 was used in place of the elsinan.

The adhesiveness of the composition was relatively inferior in comparison with that of the one described in Example for Reference 4 using elsinan, but sufficient for the practical use as sealant for sliding contact section.

EXAMPLE FOR REFERENCE 7

Ten 10 parts by weight of polyvinyl alcohol, having an average molecular weight of 100,000, 60 parts by weight of glycerin, 29.5 parts by weight of water and 0.5 parts by weight of sugar ester, were mixed to homogeneity by stirring and heating to 30° C.

The storage stability of the composition was relatively low, but sufficient for the practical use as sealant for sliding contact section.

EXAMPLE FOR REFERENCE 8

Twenty parts by weight of pullulan, having an average molecular weight of 300,000, was admixed homogeneously with 79 parts by weight of water, 0.5 parts by weight of sugar ester, and 0.1 part of "ADEKANATE B-3009A", an antifoam commercialized by Asahi Denka KK, Tokyo, Japan, while stirring and heating to 120° C.

The composition so obtained with a viscosity of about 90 poises was suitable sealant for sliding contact section in an aerosol container wherein a propellant, particularly, a liquefied gas, was used.

The composition showed neither deterioration nor alteration on six month standing at 45° C.

This example illustrates a formulation which is neither toxic nor harmful to human or animal. The composition so obtained is suitable as sealant for sliding contact section in an aerosol container wherein a compressed or liquefied gas comes into contact with the sliding contact section, and wherein various household goods, food products, cosmetics, or drugs are filled.

EXAMPLE FOR REFERENCE 9

Three parts by weight of polyethylene oxide, having an average molecular weight of 350,000 was admixed homogeneously with 96.5 parts by weight of water, "NOPCO 8034 L", an antifoam commercialized by San Nopco Ltd., Kyoto, Japan, and 0.1 part of sodium hydroxide while stirring at ambient temperature.

The composition so obtained with a viscosity of about 10,800 poises was suitable as sealant for sliding contact section in an aerosol container which may be used at a high temperature.

EXAMPLE FOR REFERENCE 10

Five parts by weight of hydroxyethyl cellulose, having an average molecular weight of 5,000, was admixed homogeneously with 94 parts by weight of water, 0.5 parts by weight of "FS ANTIFOAM 013B", an antifoam commercialized by Dow Corning Corp., Midland, U.S.A., and 0.5 parts by weight of sodium salt of higher fatty acid while stirring at ambient temperature.

The composition so obtained with a viscosity of about 980 poises was suitable as sealant for sliding contact section, and compared well with that at Example for Reference 8.

EXAMPLE FOR REFERENCE 11

A mixture of 70 parts by weight of "ELOTEX POWDER 50V/907", a powdered emulsion commercialized by Ebnother AG, Sempach-Station, Switzerland, and 3 parts of polyethylene oxide, having an average molecular weight of 300,000, was dispersed in a system of 26.8 parts by weight of water and 0.2 parts by weight of sodium hydroxide while stirring at ambient temperature.

The dispersion composition so obtained with a viscosity of about 240 poises was suitable as sealant for sliding contact section, and compared well with that at Example for Reference 8.

EXAMPLE FOR REFERENCE 12

A mixture of 20 parts by weight of "ASP #400", an aluminum silicate commercialized by Engelhart Minerals & Chemicals Corporation, N.J., U.S.A., and 20 parts by weight of "JRNC", a titanium oxide commercialized by Teikoku Kako KK, Osaka, Japan, was admixed with 40 parts by weight of 10 w/w % aqueous polyvinyl alcohol solution, polymerization degree of 550, saponification degree of 88.0%, 19 parts by weight of 1 w/v % aqueous polyethylene oxide solution, average molecular weight of about 800,000, 0.7 parts by weight of sodium hexametaphosphate, and 0.3 parts by weight of "NOPCO KF-99", an antifoam commercialized by San Nopco Ltd., Kyoto, Japan.

The dispersion composition so obtained with a viscosity of about 209 poises was suitable as sealant for sliding contact section, and compared well with that at Example for Reference 8.

EXAMPLE FOR REFERENCE 13

Two parts by weight of polyethylene oxide, having an average molecular weight of 300,000, and 0.2 parts by weight of potassium hydroxide were mixed and dissolved in 12.8 parts by weight of water. The mixture was admixed with 85 parts by weight of "VINISOL 605", 44 w/w % emulsion of acryl acid ester graft polymer having a moisture content of 56 w/w % and commercialized by Daido Kasei Kogyo KK, Tokyo, Japan, while stirring to obtain a homogeneous suspension.

The composition so obtained with a viscosity of about 9.2 poises was suitable as sealant for sliding contact section, and compared well with that at Example for Reference 8.

EXAMPLE FOR REFERENCE 14

Fifty six parts by weight of glycerin was admixed homogenously with 6 parts by weight of pullulan, having an average molecular weight of 200,000, while stirring and heating to 110° C. The admixture was further admixed with 137 parts by weight of "COUPLING SUGAR ®", an oligosaccharide mixture having a moisture content of about 25%, commercialized by Hayashibara Co., Ltd., Okayama, Japan, and the resultant was defoamed while stirring and minimizing the moisture loss.

The composition so obtained with a viscosity of about 320 poises was used as sealant for sliding contact section in different aerosol containers using a propellant, more particularly, a liquefied propellant gas, and the containers were allowed to stand at 45° C. for six months or at −5° C. for one year. No change in the gas-barriering ability of the composition was noted.

This composition was favorably usable as sealant for sliding contact section in various aerosol containers, and compared well with that at Example for Reference 8.

As is apparent from the above described examples, it was elucidated that the sealant so obtained satisfies the following conditions required to seal the sliding contact section located between the inside wall of an aerosol container body and the slidable plate inserted thereinto:

(1) Such sealant should have an appropriate viscosity and elasticity.

(2) Such sealant should adhere evenly and overall on the sliding contact section and exhibit a satisfiable gas-barriering ability.

(3) Such sealant should have a fluidity sufficient to satisfy the requirement (2) even when the sliding contact section per se is in movement.

(4) Such sealant should not be altered in properties and lost its gas-barriering ability by the liquefied gas used if it comes contact with the liquefied gas.

(5) Such sealant should not affect or deteriorate the product content when it comes into contact with the product content and the propellant.

(6) Such sealant should satisfy all requirements from (1) through (5) at living temperature, i.e. about 0°–45° C., as well as retaining such properties over a long period up to 0.5 years, preferably, over 2 years.

(7) Desirably, such sealant should be non-toxic and harmless because it has the possibility of coming into contact with and exposure to human body dependent upon its uses.

In an aerosol container having the structure according to the invention, the sealant so obtained is held by a slidable plate which is then inserted into the container body in such a manner that the sealant is placed between the inside wall of the container body and the periphery of the slidable plate to separate the inner space of the container body into product and propellant-areas.

In this case, although the sealant may be held with the slidable plate itself, an elastic- or non-elastic-sponge or a cotton-like structure immersed in the sealant may be held with the slidable plate.

The slidable plate is placed at the boundary between the product-and propellant-areas in such a manner that it is capable of sliding along on the inside wall of the container body.

As to such slidable plate, any plate may be used regardless of its material and shape as long as it contacts with the inside wall of the container body to hold the sealant and plays a partition to isolate the product-and propellant-areas. Generally, suitable materials are metal, plastic, wood, paper and ceramic, and suitable shapes are disc, bowl and piston.

Unlike the sliding plate used in conventional aerosol container, an aerosol container having the structure according to the invention does not require a high close contact of the slidable plate to the inside wall of the container body since the sealant in layer, as well as slidable plate per se, exhibits a satisfiable gas-barriering property.

For example, it is confirmed that the objects of the present invention can be completely accomplished by use of a slidable plate having an outside diameter smaller by 0.8 mm than the inner diameter of the container body used when a sealant having a viscosity of 300 poises or higher is used. Thus, in addition to special containers having neither seam nor difference in level on their inside wall, mass-producible side-seamed containers can be used as the container body in the invention. The container body may be manufactured transparent with a suitable material such as plastic.

The thickness of the sealant layer sufficient to obtain a satisfiable gas-barriering ability is, generally, 2 mm or more, preferably, in the range of 4–40 mm, dependent both on the physical properties of the product filled as well as on the physical properties and pressure of the propellant used. Of course, the sealant can be used in two or more layers.

If the sealant has the possibilities of contaminating or deteriorating the product, it is preferable to provide two or more sealant layers: A sealant having physical properties identical or similar to those of the product should be used on the product side, and another sealant containing either water or a polyol having a much higher gas-barriering ability on the propellant side. Thus, a high quality aerosol container much more free from these disadvantages can be obtained.

The propellant area can be provided by inserting the slidable plate into the container body to separate its inner space into two isolated sections, and installing a bottom plate having a propellant inlet at the opening end of one section by use of a seamer. This inlet can be used to inject a compressed- or liquefied-gas, as well as to remove a residual propellant from the container body when the product is used up.

The other section of the container body isolated by the slidable plate is used as the product area.

The products to be packed into the product area are those which can be spouted out with the propellant, for example, those in liquid, fluid, paste and plastic form. Examples of such products are foodstuffs such as mayonnaise, sauce, catsup, curry roux, extracts of stew and soup, table syrup, honey, jelly, pudding, chocolate, bean jam, margarine, cheese, butter, butter cream, custard cream, whipped cream, flour paste, peanut paste, fruit paste, jam, marmalade, condensed fruit juice, fish meat products, meat products, feeds, seeds, and fish feeder; cosmetics such as dentifrice, milky lotion, shaving cream, pack, hair shampoo, hair rinse, hair cream, pomade, depilatory adhesive composition; pharmaceuticals such as ointment, poultice medicine, rat poison paste; chemical products such as calking, sealant, and adhesive; etc.

In the process for manufacturing aerosol container according to the invention, the product area is filled with a suitable product and sealed with a head plate having a product spout by use of a seamer. Preferably, the product area should be deaerated during the filling and sealing steps. Suitable means which is openable and closable, such as valve or cock, may be equipped at the spout. A suitable nozzle member may be also used if necessary.

In order to drive the slidable plate and also to spout out the product content, a suitable propellant can be injected into the propellant area through the inlet. A high pressure gas such as that of nitrogen, carbon dioxide or laughing gas; or a liquefied gas such as that of "FREON 12" (a liquefied fluorocarbon, a product of Du Pont EI de Nemours & Co., Wilmington, Del, U.S.A.), LPG or butane can be injected in an amount sufficient to spout out the product, more particularly, sufficient to keep the pressure in the total volume of the product- and propellant-areas over atmospheric pressure, preferably, at a pressure in the range of 1.5–15 $kg/cm^2$.

After filling the product and sealing the area with the top plate, the aerosol container per se may be, if necessary, sterilized with suitable procedure such as steam heating, micro wave dielectric heating, Y-ray irradiation in such that the product content is durable to a prolonged storage.

As described above, the aerosol product manufactured according to the present invention does not have the fear of causing incorporation of the propellant into the product, and maintains the quality of fresh products for a long period of time, as well as having an additional advantage that the product content in the same aerosol container can be used for long time by spouting out small portions of the content when needed.

Unlike bottles or cans which were conventionally used for packaging products, the container according to the present invention, in some sense, saves resources and energy. It may be extensively used for packaging, for example, food products, medicines, cosmetics and chemical products.

The present invention will be illustrated by several embodiments with Reference to the drawing figures.

EXAMPLE 1

Silicone sealant

Slidable plate (2) was inserted into container body (1) as follows: While keeping the bottom of container body (1) upward, the first slidable plate (2a) was inserted thereinto through the bottom opening to the prescribed point which is determined by necessary volumes of product- and propellant-areas (3) and (4), and the sealant in Example for Reference 1 was supplied onto the upside of the first slidable plate in an amount to give an about 4 mm thick layer. After laminating the second slidable plate (2b) on the sealant layer, another layer of the sealant described in Example for Reference 10, was formed on the upside of the second slidable plate, and the third slidable plate (2c) was then laminated thereon, similarly as above. While holding the first slidable plate (2a) to assure its position, a relatively high pressure was applied between the first—and third slidable plates (2a) and (2c) to compress the first—and second sealant layers (5a) and (5b) located between the slidable plates (2a), (2b) and (2c) and also to closely adhere these sealant layers on these slidable plates. Thus, a layer of sealant for sliding contact section having a perfect gas-barriering ability was formed.

Propellant area (4) was sealed by installing a bottom plate (7) having a propellant inlet (6) at the bottom opening of container body (1) by use of a seamer.

Thereafter, the container body (1) was stood on its bottom, and a premeasured amount of silicon sealant was filled into product area (3). Top plate (9) having a product spout (8) was then installed on the top opening of container body (1) by use of a crimp sealing machine to seal product area (3). Nozzle means (10) of a suitable shape may be equipped on product spout (8) if necessary. "FREON 12", a liquefied fluorocarbon commercialized by Du Pont de Nemours & Co., Wilmington, Del., U.S.A., was filled into propellant area (4) through propellant inlet (6) to obtain an aerosol container.

The aerosol container using silicone sealant as the product is suitable for a prolonged use because it retains the quality of fresh silicon sealant for long time without fear of causing deterioration or contamination of the silicone sealant by the propellant. Thus, the aerosol container is suitable for use as a waterproof calking for filling and joining the cracks in washroom or bathroom.

Although containers obtained by the steps of inserting slidable plate (2) in container body (1), and sealing its bottom opening with bottom plate (7) having a propellant inlet (6) are unfinished containers, can manufacturers can easily practice these steps and supply such unfinished container to aerosol product manufctures as containers directed to aerosol products. Aerosol product manufacturers manufacture their aerosol product by filling their product into product area (2) of the unfinished containers, equipping top plate (9) having product spout (8) to seal product area (3), and filling a suitable propellant into propellant area (4).

EXAMPLE 2

Silicone sealant

Figure 3:
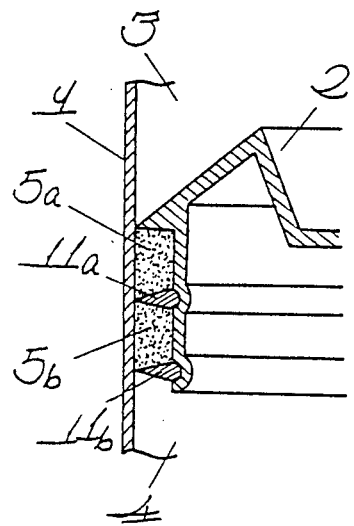

This example illustrates an aerosol container having a similar structure as shown in Example 1, wherein sealant layer (5) held with slidable plate (2) is formed into annulation as shown in FIG. 3.

Similarly as in Example 1, the inner space of container body (1) was separated into product- and propellant-areas (3) and (4) by inserting slidable plate (2) to the prescribed position. A 5 mm thick annular elastic sponge packing (5a), immersed in the sealant described in Example for Reference 2, was fitted to cover the periphery of slidable plate (2), and laminated on the flange-like part of slidable plate (2). In order to prevent movement of the first sealant layer (5a), the first engaging plate (11a) in annular form was fitted and engaged onto the periphery of slidable plate (2). Similarly as above, the second sealant layer (5b) in similar annular form as the first sealant layer (5a) was inserted, pressed, and laminated on the first engaging plate (11a). Thus, a layer of sealant for sliding contact section excellent in gas-barriering ability was formed.

Similarly as in Example 1, the container body was prepared, and the silicone sealant and "FREON 12" were filled into product- and propellant-areas (3) and (4) respectively to obtain an aerosol container.

The product is an excellent aerosol container, and compares well with that at Example 1.

The features of the aerosol container using an annular sealant layer are as follows:

(1) Sealant layer (5) can be easily composed in single or more layers at a low-cost.

(2) Since slidable plate (2), and the first- and second engaging plates (11a) and (11b) can be incorporated in one body, annular sealant layers (5a) and (5b) can be fitted thereon.

(3) Unlike the aerosol container disclosed in Example 1, the step of closely contacting each sealant layers (5a), (5b), . . . with the inside wall of container body (1) and each slidable plate (2a), (2b), . . . by applying a relatively high pressure to both sides of each laminated slidable plate (2a), (2b), . . . to compress each sealant layer (5a), (5b), . . . located between each slidable plate (2a), (2b), . . . is not required.

(4) A sealant having a viscosity much lower than that used in Example 1 can be favorably used.

(5) This aerosol container structure is suitable in a small aerosol container wherein the sliding distance of slidable plate (2) is relatively short.

EXAMPLE 3

Acryl Emulsion Sealant

An aerosol container was manufactured similarly as in Example 2, except that the sealants described in Examples for Reference 13 and 5 were used in the first- and second sealant layers (5a) and (5b) respectively, and that an acryl emulsion sealant was filled into product area (2).

This product is suitable as calking for plugging cracksand gaps in building walls, as well as for adhering foamed concrete panels.

EXAMPLE 4

Chocolate

An aerosol container was manufactured by filling a chocolate paste into an aerosol container similarly as in Example 1, except that the sealants in Examples for Reference 8 and 4 were used in the first- and second sealant layers (5a) and (5b) respectively, and that "FREON 12" and carbon dioxide gas were filled into product area (4).

With use of the aerosol container, one can draw letters and figures on a sponge cake by releasing product spout (8) to spout out controlled small portions of the chocolate content, obtaining, for example, a birthday cake.

EXAMPLE 5

Jam

This Example is an embodiment using single sealant layer (5). The sealant described in Example for Reference 10 was supplied to give a thickness of 8 mm, and a blueberry jam paste was filled into product area (3). The resultant was sterilized by micro wave dielectric heating to about 90° C., cooled and processed similarly as in Example 1 to produce an aerosol container, except that "FREON 12" and nitrogen were filled with a relatively high pressure.

This product is convenient to spread blueberry jam on toast.

EXAMPLE 6

Ointment

The captioned product was manufactured similarly as in Example 2, except that the sealants described in Example for Reference 12 and 2 were immersed in the first- and second sealant layers (5a) and (5b) respectively, and that an anti-histamine ointment was filled into product area (3).

One can evenly apply the ointment on guaze, oilpaper, or, directly, on the affected site of one's body without using fingers or a moldboard since the content can be directly spouted out from the container in beltlike form.

EXAMPLE 7

Dentifrice

An aerosol container was manufactured by filling a dentifrice into product area (3) similarly as in Example 1, except that the sealants described in Examples for Reference 14 and 3 were supplied to the first- and second sealant layers (5a) and (5b) to give respective thickness of 4 mm and 3 mm, and that a liquefied butane gas was filled under a relatively high pressure.

With use of the product, a large-size dentifrice can be placed on a relatively small-space washstand since the product can be used in its vertical position. Thus, the product is suitable in common use by a relatively large number of people such as family members.

While there has been described several preferred forms of the invention, obviously modifications and variations are possible in light of the above teachings. It is therefore to be understood that within the scope of the appended claims, the invention may be practiced otherwise than as specifically described.

We claim:

1. An aerosol container structure, comprising:
   (a) a container body in cylindrical form having at its different ends a product spout and a propellant inlet both openable and closable;
   (b) a plate member, comprising at least one plate slidable along the inside wall of the container body and having first and second means about its periphery for holding sealants in sliding contact with the inside wall of the container body, said first holding means being closer to said product spout than said second holding means and said second holding means being closer to said propellant inlet than said first holding means, separating the inner space of the container body into two sections, one section with the pocket spout being a product area and the other section with the propellant inlet being a propellant area, said product area containing a product and said propellant area containing a propellant;
   (c) a first sealant comprising a composition selected from the group consisting of water, polyol and mixtures thereof and having physical properties essentially identical to those of the product, the first sealant being placed in the first holding means; and
   (d) a second sealant comprising a composition selected from the group consisting of water, polyol and mixtures thereof and forming an effective gas-barrier to the propellant, the second sealant being placed in the second holding means.

2. An aerosol container structure according to claim 1, wherein said first and second sealants have viscosities in the range of 5–200,000 poises.

3. An aerosol container structure according to claim 1, wherein said first and second sealants contain 0.001–10 parts by weight of a viscosity-imparting agent against one part by weight of water or polyol.

4. An aerosol container structure according to claim 1, wherein a food product, pharmaceutical, cosmetic or chemical product is filled into said product area.

5. An aerosol container structure according to claim 1, wherein a compressed—or liquefied—gas is filled into said propellant area.

* * * * *